Nov. 4, 1969 S. C. GIOIA ET AL 3,477,034
ZERO SUPPRESSION CIRCUIT FOR DIFFERENTIAL AMPLIFIERS
Filed Dec. 14, 1966
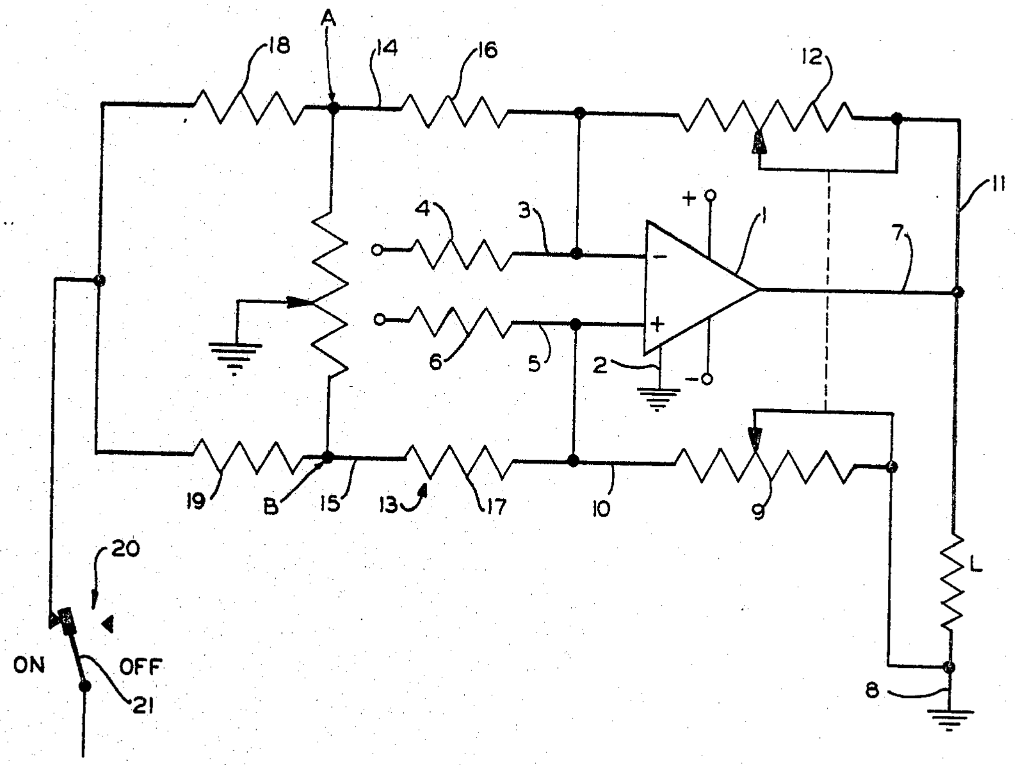
INVENTORS
STEVE C. GIOIA
LOUIS H. FRICKE, JR.
BY Robert J. Schaap
ATTORNEY

United States Patent Office 3,477,034
Patented Nov. 4, 1969

3,477,034
ZERO SUPPRESSION CIRCUIT FOR DIFFERENTIAL AMPLIFIERS

Steve C. Gioia and Louis H. Fricke, Jr., St. Louis, Mo., assignors to Monsanto Company, St. Louis, Mo., a corporation of Delaware Filed Dec. 14, 1966, Ser. No. 601,609
Int. Cl. H03f 1/34
U.S. Cl. 330—69 9 Claims

ABSTRACT OF THE DISCLOSURE

A zero suppression circuit including an operational amplifier and having positive and negative input signal lines. A feedback line connected across each of the input signal lines and additional compensating input signals are added to the feedback lines wherein the compensating signals are of equal magnitude and opposite signs to the signals in the two input signal lines.

This invention relates in general to certain new and useful improvements in suppression circuits and more particularly to zero suppression circuits for differential amplifiers.

The presently available, conventional differential amplifiers generally employ a resistive negative feedback circuit associated with an operational amplifier. Furthermore, these conventional devices usually employ two or more inputs. However, the conventional amplifiers suffer from the effects of an input offset current which creates errors in the output of the amplifier. For example, due to the offset current, an input of 10 volts at a sufficiently high impedance level may produce an effective input of 9.8 volts.

It is, therefore, the primary object of the present invention to provide a zero suppression circuit for a differential amplifier which provides compensation for offset currents.

It is another object of the present invention to provide a zero suppression circuit of the type stated which is capable of shifting a non-significant portion of a signal and amplifying the significant portion of the signal.

It is an additional object of the present invention to provide a zero suppression circuit of the type stated which suppresses the input signal applied to a differential amplifier and permits operation as a conventional differential amplifier.

It is a further object of the present invention to provide a zero suppression circuit of the type stated which is simple in its operation and relatively economical to manufacture.

With the above and other objects in view, our invention resides in the novel features of form, construction, arrangement and combination of parts presently described and pointed out in the claims.

In the accompanying drawings

FIGURE 1 is a schematic view of a zero suppression circuit constructed in accordance with and embodying the present invention.

Generally speaking, the zero suppression circuit of the present invention comprises a differential amplifier having two input lines for receipt of the input signal. The amplifier is provided with a negative feedback loop connected to the output of the amplifier and one of the inputs. The other of the inputs is connected to ground and to the output of the differential amplifier. Suppressor signals are also added to the output of the amplifier and each of the inputs. A potentiometer provides for adjustment of a compensating signal. This is accomplished by adding the negative or the signal of opposite sign to the signal which is added to the differential amplifier. Thus, if a positive signal were added to one input terminal of the differential amplifier, the compensating signal would be of opposite sign and equal magnitude. The same applies to the signal placed on the other input of the differential amplifier. In this manner, it is possible to shift the portion of the signal in which there is no interest and thereby reduce the variable in the signal to a zero level. Thereafter, it is possible to amplify the variable signal without distortion thereof.

Referring now in more detail and by reference characters to the drawing which illustrates a preferred embodiment of the present invention, A designates a zero suppression circuit generally comprising an operational amplifier 1, which is provided with a conventional ground 2. The amplifier 1 also includes a conventional negative input line or conductor 3 having an input resistor 4 and a positive input line or conductor 5 with an input resistor 6. The input lines 3, 5 are generally connected to some suitable source for providing the input signal, which is to be suppressed. For example, the input lines 3, 5 may be connected to an analogue computer for receipt of a signal which may be a high direct voltage signal carrying a small desired variable, where the variable of interest may be super-imposed on this voltage plateau.

The amplifier 1 is also provided with an output line 7, which is in turn, connected to a load L, the latter, in turn, being grounded at 8. Furthermore, by reference to FIGURE 1, it can be seen that the input line 5 containing the positive input terminal is connected through a variable gain resistor 9 which is on the ground side of the load L.

A feedback loop 11 is connected across the amplifier 1 from the output line 7 to the input line 3 for providing negative resistive feedback. A variable gain resistor 12 is also interposed in the feedback line 11. This latter resistor provides a dual purpose in providing the negative resistive feedback and also assists in the adjustment of the gain of the amplifier 1. Furthermore, the variable resistors 9 and 12 are "ganged" or connected mechanically in common for common adjustment thereof.

Connected to the feedback loop 11 and to the feedback loop 10 is a voltage compensating circuit 13 which includes a compensating conductor 14 connected to the feedback loop 11 and a conductor 15 connected to the feedback loop 10. The lines 14 and 15 each contains compensating resistors 16, 17 respectively in the manner as illustrated in FIGURE 1. Also connected across the conductors 14, 15 is a compensating potentiometer P. Also connected to the opposite poles of the potentiometer P is a voltage dividing circuit containing resistors 18, 19 which in turn have a common connection and are connected to one pole of an off-on switch 20. It can be seen that the movable arm 21 of the switch 20 is connected to an input voltage so that when the switch 20 is shifted to the "on" position, the suppression circuit is connected to the amplifier 1. However, when the arm 21 is shifted to the "off" position of the switch 20, the differential amplifier 1 is then capable of operating as a conventional differential amplifier.

It can be seen that a small resistance change in the suppression network can supply sufficient current to suppress the full output span of the input signal in the conductors 3, 5. Therefore, the suppression network which includes resistors 16, 17 presents a high impedance to the operational amplifier 1. Accordingly, it can be seen that a change in the output voltage of the amplifier 1 due to a change in the input impedance and the input offset current is minimal. Furthermore since the network is symmetrical and is connected to the +, — differential input, this further serves to reduce any effects of the input offset currents.

In essence, the suppression circuit which provides a compensating signal to each of the feedback loops 10 and 11, is designed to match the input signals in the input lines 3 and 5. Accordingly, if the conductor 3 contains an input signal of a minus 4 volts with respect to ground, and the conductor 5 contains an input signal of a positive 3 volts, then the potentiometer P would be adjusted to provide a differential voltage between points A and B of 7 volts with point A being more positive with respect to ground than point B. This suppression voltage is equal in magnitude to the input signal, but the polarity of the suppression voltage is opposing the input signal's polarity. It is possible to maintain any ratio of voltages and polarity on the conductors 14 and 15 by means of the potentiometer P up to approximately ⅔ v. Accordingly, it can be seen that the resistors 18 and 19 should be quite small when compared to the resistors 16 and 17. In fact, the resistors 18 and 19 should be approximately 20 times smaller than the resistors 16 and 17 respectively.

A test was made with the suppressor circuit of the present invention and each of the resistors 16, 17 were established at 20 times the maximum value of the potentiometer P. Furthermore, the resistors 18, 19 were established at ½ of the maximum value of the potentiometer P. Actually, the resistors 18, 19 were each established at 5K ohms. The input voltage to the resistors 18, 19 was a total of 15 volts. It was found that if the potentiometer P was established so that 6985.2 ohms was presented as an impedance to the conductor 14 to ground, and 3014.8 ohms was presented as an impedance to the conductor 15 to ground, the voltage in the conductor 14 prior to the resistor 16 was 8.7422 volts, and the voltage in the conductor 15 prior to the resistor 17 was 5.6423 volts. It was found that this matched an input signal in the positive conductor 5 of a positive 3.10 volts when a zero voltage was maintained on the negative conductor 3.

In essence, it can be seen that the circuit of the present invention is capable of providing a complete suppression of a differential amplifier by using the full gain of the amplifier and without interfering with the output signal thereof. Furthermore, it can be seen that the currents will flow in the loops 10, 11 in the manner as illustrated in FIGURE 1. Actually, there would be some current flow in the reverse direction in the feedback loop 10 if the circuit were not balanced, that is there was no zero suppression. Accordingly, it can be seen that if a variable of interest is super-imposed on a voltage plateau, then a signal of opposite voltage is added thereto, the variable of interest will remain and this variable of interest can be amplified by using the full gain of the amplifier 1.

It should be understood that changes and modifications in the form, construction, arrangement and combination of parts may be made and substituted for those herein shown without departing from the nature and principle of our invention.

Having thus described our invention, what we desire to claim and secure by Letters Patent is:

1. A suppression circuit for extracting a variable of interest superimposed on a voltage plateau and providing amplification of said variable, said circuit comprising an operational amplifier, a first input to said amplifier for adding a negative input signal to said amplifier, a second input to said amplifier for adding a positive input signal to said amplifier, a first negative feedback line connected to the output of said amplifier and to said first input, a second negative feedback line connected to the output of said amplifier and to said second input, a compensating circuit having a first and second compensating signal lines, said first compensating signal line being connected in common to said first input and first feedback line at a first summing junction, said second compensating signal line being connected in common to said second input and second feedback line at a second summing junction, said first compensating signal line carrying a compensating signal which is opposite in polarity to the negative input signal, said second compensating signal line carrying a compensating signal which is opposite in polarity to said positive input signal, and potentiometer means operatively connected to said first and second compensating signal lines for adjusting and adding said compensating signals to said first and second feedback lines of equal magnitude and opposite signs to the input signals in said first and second inputs respectively.

2. The apparatus of claim 1 further characterized in that fixed resistors of equal magnitude are interposed in each of the inputs to the amplifier.

3. The apparatus of claim 1 further characterized in that said compensating circuit comprises fixed resistors of equal magnitude in each of the compensating signal lines.

4. The apparatus of claim 1 further characterized in that said compensating circuit comprises fixed resistors of equal magnitude in each of the compensating signal lines, and a voltage dividing circuit connected across the terminals of said potentiometer means.

5. The apparatus of claim 1 further characterized in that said compensating circuit comprises fixed resistors of equal magnitude in each of the compensating signal lines and a voltage dividing circuit connected across the terminals of said potentiometer means, said voltage dividing circuit including separate resistors connected to each terminal of said potentiometer means and each of said last-named resistors being of equal magnitude.

6. The apparatus of claim 5 further characterized in that the resistors in said voltage dividing circuit are substantially smaller in magnitude than the respective resistors in said first and second compensating signal lines.

7. A suppression circuit for extracting a small component A.C. signal of interest superimposed on a relatively large D.C. voltage plateau and providing amplification of said A.C. signal, said circuit comprising an operational amplifier, a first input to said amplifier for adding a negative signal to said amplifier, a second input to said amplifier for adding a positive signal to said amplifier, a first negative feedback line connected to the output of said amplifier and to said first input, a second negative feedback line connected to the output of said amplifier and to said second input, a compensating circuit connected in common to said first input and first feedback line and in common to said second input and second feedback line, and means associated with said compensating circuit for adding compensating D.C. voltage signals to said first and second feedback lines of equal magnitude and opposite signs to the signals in said first and second inputs respectively.

8. A suppression circuit for extracting a variable of interest superimposed on a voltage plateau and providing amplification of said variable, said circuit comprising an operational amplifier, a first input to said amplifier for adding a negative signal to said amplifier, a second input to said amplifier for adding a positive signal to said amplifier, a first negative feedback line connected to the output of said amplifier and to said first input, a second negative feedback line connected to the output of said amplifier and to said second input, a compensating circuit connected in common to said first input and first feedback line and in common to said second input and second feedback line, a variable resistor interposed in each of said feedback lines for adjusting the gain of said amplifier and means associated with said compensating circuit for adding signals to said first and second feedback lines of equal magnitude and opposite signs to the signals in said first and second inputs respectively.

9. The apparatus of claim 8 further characterized in that each of said variable resistors are connected to operate in unison.

References Cited

UNITED STATES PATENTS 3,209,277 9/1965 Burwen ------------ 330—69

NATHAN KAUFMAN, Primary Examiner

U.S. Cl. X.R.

330—84